US010161373B2

(12) United States Patent
Schmitter et al.

(10) Patent No.: US 10,161,373 B2
(45) Date of Patent: Dec. 25, 2018

(54) METHOD AND DEVICE FOR STARTING OR RESTARTING THERMAL ENGINE

(71) Applicant: VALEO EQUIPEMENTS ELECTRIQUES MOTEUR, Creteil (FR)

(72) Inventors: Romain Schmitter, Vincennes (FR); Cyril Granziera, Paris (FR); Luc Kobylanski, Paris (FR); Ludovic Bodin, Le Plessis Trevise (FR); Ronald Malbranque, Vincennes (FR)

(73) Assignee: Valeo Equipements Electriques Moteur, Creteil (FR)

( * ) Notice: Subject to any disclaimer, the term of this patent is extended or adjusted under 35 U.S.C. 154(b) by 0 days.

(21) Appl. No.: 15/318,933

(22) PCT Filed: Jun. 11, 2015

(86) PCT No.: PCT/FR2015/051542
§ 371 (c)(1),
(2) Date: Dec. 14, 2016

(87) PCT Pub. No.: WO2015/193586
PCT Pub. Date: Dec. 23, 2015

(65) Prior Publication Data
US 2017/0152827 A1    Jun. 1, 2017

(30) Foreign Application Priority Data

Jun. 20, 2014 (FR) ...................................... 14 55677

(51) Int. Cl.
*F02N 11/04* (2006.01)
*F02B 67/06* (2006.01)
(Continued)

(52) U.S. Cl.
CPC .............. *F02N 11/04* (2013.01); *F02B 67/06* (2013.01); *F02N 11/0803* (2013.01);
(Continued)

(58) Field of Classification Search
CPC .............. F02N 11/0803; F02N 11/0859; F02N 11/0862; F02N 11/04; F02N 15/08; F02B 67/06
(Continued)

(56) References Cited

U.S. PATENT DOCUMENTS 6,817,328 B2 * 11/2004 Buglione ................ F02N 15/08
                                                123/179.25
6,834,631 B1 * 12/2004 Blackburn .............. F02B 67/06
                                                123/179.3
(Continued)

FOREIGN PATENT DOCUMENTS

DE     102012203374 A1    9/2013
EP        1760297 A2    3/2007
(Continued)

*Primary Examiner* — Mahmoud Gimie
(74) *Attorney, Agent, or Firm* — Berenato & White, LLC

(57) ABSTRACT

The method according to the invention calls upon a rotary electric machine (1) comprising a drive member (3) and a transmission member (4) of the belt or chain type, collaborating with the drive member and with the combustion engine (2) in order to start or restart the combustion engine, a tensioner (6) being provided to press against one strand (7) of the transmission member that extends between the rotary electric machine and the combustion engine. According to the invention, in a first stage, the rotary electric machine (1) supplies a predetermined reduced torque in the direction of starting for a predetermined duration in order to tension the transmission member (4) and then, in a second stage, the
(Continued)

rotary electric machine (1) supplies a predetermined optimum torque for rapidly turning over the combustion engine (2) and causing it to start.

16 Claims, 3 Drawing Sheets

(51) Int. Cl.
    *F02N 11/08*     (2006.01)
    *F02N 15/08*     (2006.01)
    *F02D 41/20*     (2006.01)
    *F16H 7/08*     (2006.01)

(52) U.S. Cl.
    CPC ...... *F02N 11/0859* (2013.01); *F02N 11/0862* (2013.01); *F02N 15/08* (2013.01); *F02D 2041/2044* (2013.01); *F02N 2200/041* (2013.01); *F02N 2200/045* (2013.01); *F02N 2300/104* (2013.01); *F16H 2007/0806* (2013.01); *F16H 2007/0893* (2013.01)

(58) Field of Classification Search
    USPC ...................................... 123/179.3
    See application file for complete search history.

(56) References Cited

U.S. PATENT DOCUMENTS

| | | | |
|---|---|---|---|
| 7,322,895 B2* | 1/2008 | Namuduri | F16H 7/1236 474/109 |
| 7,681,546 B2 | 3/2010 | Lecole et al. | |
| 8,362,630 B2 | 1/2013 | Armiroli et al. | |
| 8,674,633 B2* | 3/2014 | Rouis | F02N 11/04 318/400.11 |
| 8,770,163 B2* | 7/2014 | Quincerot | F02N 11/0814 123/179.1 |
| 9,038,589 B2* | 5/2015 | Granziera | F02N 11/04 123/179.3 |
| 2004/0245949 A1* | 12/2004 | Ueda | H02P 6/182 318/400.14 |
| 2006/0017290 A1 | 1/2006 | Murty et al. | |
| 2010/0207568 A1* | 8/2010 | Bodin | H02P 1/16 318/717 |
| 2012/0298062 A1* | 11/2012 | Granziera | F02N 11/04 123/179.3 |
| 2013/0328323 A1 | 12/2013 | Reik et al. | |
| 2015/0051820 A1* | 2/2015 | Schmidt | F02N 11/04 701/113 |

FOREIGN PATENT DOCUMENTS

| | | |
|---|---|---|
| FR | 2858665 A1 | 2/2005 |
| FR | 2875549 A1 | 3/2006 |
| FR | 2918127 A1 | 1/2009 |
| FR | 2925128 A1 | 6/2009 |
| FR | 2949514 A1 | 3/2011 |
| WO | WO2009077687 A2 | 6/2009 |
| WO | WO2010010271 A2 | 1/2010 |
| WO | WO2012107016 A2 | 8/2012 |

* cited by examiner

METHOD AND DEVICE FOR STARTING OR RESTARTING THERMAL ENGINE

CROSS-REFERENCE TO RELATED APPLICATIONS AND CLAIM TO PRIORITY

This application is a national stage application of International Application No. PCT/FR2015/051542 filed Jun. 11, 2015, which claims priority to French Patent Application No. 1455677 filed Jun. 20, 2014, the disclosures of which are incorporated herein by reference and to which priority is claimed.

FIELD OF THE INVENTION

The present invention relates to a method and a device for starting or restarting a thermal engine, in particular of a motor vehicle.

The invention also relates to an alternator-starter which can implement the method, and is contained in this device.

BACKGROUND OF THE INVENTION

Considerations of energy-saving and reduction of pollution, particularly in an urban environment, are leading motor vehicle manufacturers to equip their models with an automatic stopping/restarting system, such as the system known as "stop and go".

As the company VALEO EQUIPEMENTS ELECTRIQUES MOTEUR recalls in its patent application FR2875549, functioning of the vehicles according to the stop and go mode is enabled by means of a reversible electrical machine, or alternator-starter, which is coupled to the thermal engine, and is supplied by an inverter in starter mode.

The use of an alternator-starter in a stop and go functioning mode consists under certain conditions of giving rise to complete stoppage of the thermal engine when the vehicle itself is at a standstill, then restarting the thermal engine subsequently, as the result for example of an action by the driver interpreted as a request for restarting.

A typical stop and go situation is that of stoppage at a red light. When the vehicle stops at the light, the thermal engine is automatically stopped, then, when the light turns green, the engine is restarted by means of the alternator-starter, as a result of detection by the system that the driver has pressed the clutch pedal.

In general, the alternator-starter must produce the appropriate engine torque as soon as a stimulus occurs indicating the wish of the driver to restart or relaunch his vehicle.

It will be appreciated that this automatic restarting function carried out by an alternator-starter system is a function which must be as clear as possible for the driver of the vehicle.

In particular, the time between the starting command and the actual starting of the thermal engine by means of the alternator-starter must be as short as possible.

For this purpose, a pre-flow step is carried out during which the rotor of the alternator-starter is supplied with electricity without power being supplied to the stator.

Upon completion of the pre-flow step, power is supplied to the stator, and the alternator-starter and the alternator-starter produces torque which is great enough to allow the thermal engine to be driven rapidly beyond the compression passage point, such as to start the engine.

This reversible alternator is mostly implanted at a face of the thermal engine, on which face a crankshaft pulley of the thermal engine is present.

A belt is provided, firstly in order to drive an alternator pulley, and if applicable one or a plurality of accessories, when the thermal engine is functioning, and secondly, in order to transmit torque supplied by the reversible alternator to the crankshaft pulley during phases of restarting or relaunching.

A tensioner is also generally provided to be supported on a strand of the belt between the alternator pulley and the crankshaft pulley.

In this configuration, the transmission of substantial engine torque by the belt upon completion of the pre-flow step can damage the belt.

In order to eliminate this disadvantage, the applicant company has proposed in the international application WO2009/077687 to limit the duration of the pre-flow step.

However, it has been found that the sudden variation of torque generated acoustic effects via the tensioner which were considered detrimental by the users.

In the French patent application FR2918127, the applicant company proposed to tension the belt by applying a torque in the direction opposite that of the starting. However, this solution does not reduce the variation of torque, on the contrary, and thus does not eliminate the acoustic effects. In addition, the tensioner must be compatible.

A need consequently exists for a method and a device for starting or restarting a thermal engine which ensures a short starting or restarting time, whilst limiting the acoustic effects which are perceived to be detrimental by the user.

SUMMARY OF THE INVENTION

The objective of the present invention is to fulfil this need, and its subject is specifically a method for starting or restarting a thermal engine, in particular of a motor vehicle, by means of a rotary electrical machine.

This rotary electrical machine comprises a drive unit, and is associated with a transmission unit of the belt or chain type which cooperates with this drive unit and with the thermal engine in order to give rise to starting or restarting of this thermal engine.

A tensioner is provided in order to be supported on a strand of the transmission unit which extends between the rotary electrical machine and the thermal engine.

According to the invention, the method according to the invention includes the two following steps:

in a first step, the rotary electrical machine supplies a predetermined reduced torque in the starting direction for a predetermined time, in order to tension the transmission unit, without however permitting the passage to the compression point; and in a second step, the rotary electrical machine supplies an optimal predetermined torque to drive the thermal engine rapidly; and the predetermined reduced torque is controlled by controlling an angle of advance of an inverter which supplies the rotary electrical machine.

In a starting phase, the predetermined reduced torque is highly advantageously lower than a nominal torque necessary for passage of a compression point of the thermal engine.

Alternatively, in a relaunching phase, the predetermined reduced torque preferably depends on a speed of rotation of the rotary electrical machine.

In this case, the predetermined reduced torque is preferably also controlled by controlling an angle of opening of the inverter.

According to the method of the invention, advantage is derived from control of the predetermined reduced torque by also controlling an excitation current of the rotary electrical machine.

In certain applications, the first step of the method according to the invention can be preceded by a pre-flow step, the second step then being designed such as to take this pre-flow step into account and not detract from its advantage.

The invention also relates to a device for starting or restarting a thermal engine, in particular of a motor vehicle, which is designed for implementation of the above-described method.

This device is of the type comprising:
a rotary electrical machine provided with a drive unit;
a transmission unit of the belt or chain type, which cooperates with the drive unit of the rotary electrical machine and with the thermal engine in order to give rise to starting or restarting of this thermal engine;
a tensioner to be supported on a strand of the transmission unit extending between the rotary electrical machine and the thermal engine;
an inverter which supplies the rotary electrical machine;
a control system for the rotary electrical machine which controls an engine torque.

The device for starting or restarting a thermal engine according to the invention is distinguished in that it additionally comprises means for acquisition of at least one parameter from amongst the group:
a speed of rotation of the rotary electrical machine;
an angle of advance of the inverter;
an angle of opening of the inverter;
an excitation current of the rotary electrical machine;
a temperature of the rotary electrical machine;
and in that the control system comprises a cartography of a predetermined reduced torque according to at least this parameter, such as to tension the transmission unit when the engine torque is equal to the predetermined reduced torque for a predetermined time, this predetermined reduced torque being lower than an optimal torque which makes it possible to drive the thermal engine rapidly.

The subject of the invention is also a control system for a rotary electrical machine which is designed to provide a device for starting or restarting a thermal engine with the above characteristics.

Within the context of the invention, an alternator-starter which is designed to be coupled to a thermal engine, in particular of a motor vehicle, also highly advantageously comprises an integrated control system of this type.

These few essential specifications will have made apparent to persons skilled in the art the advantages provided by the invention in comparison with the prior art.

The detailed specifications of the invention are given in the following description in association with the appended drawings. It should be noted that these drawings serve the purpose simply of illustrating the text of the description, and do not constitute in any way a limitation of the scope of the invention.

DETAILED DESCRIPTION OF THE PREFERRED EMBODIMENT(S)

Figure 1:
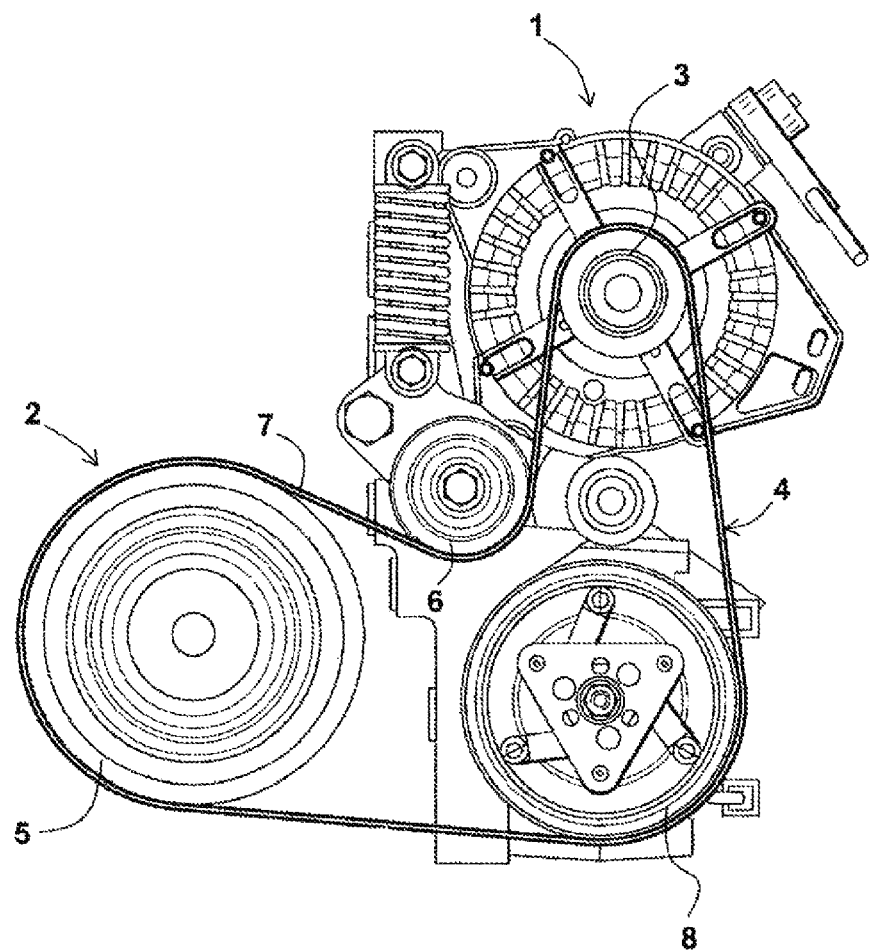
FIG. 1 represents partially a face of a thermal engine of a motor vehicle and a mechanical arrangement of a device for starting or restarting of a type according to the invention.

The preferred embodiment of the invention concerns vehicles equipped with an alternator-starter 1 arranged on a face of a thermal engine 2 as represented in FIG. 1.

As shown clearly in FIG. 1, the alternator-starter 1 is provided with a drive unit, formed in this case by a first pulley 3, with which there cooperates a transmission unit constituted by a belt 4 in order to drive the thermal engine 2 by means of a second pulley 5 integral with a crankshaft of this thermal engine 2.

A tensioner 6 comprising a roller is supported on a strand 7 of the belt 4 extending between the alternator-starter 1 and the crankshaft of the thermal engine 2.

The belt 4 is also used, via another strand of the belt 4, to drive by means of a third pulley 8 an accessory, for example an air-conditioner compressor, not represented.

In a manner which in itself is known, the alternator-starter 1 is supplied in motor mode by an inverter, and is controlled by a control system which controls the engine torque.

Figure 2:
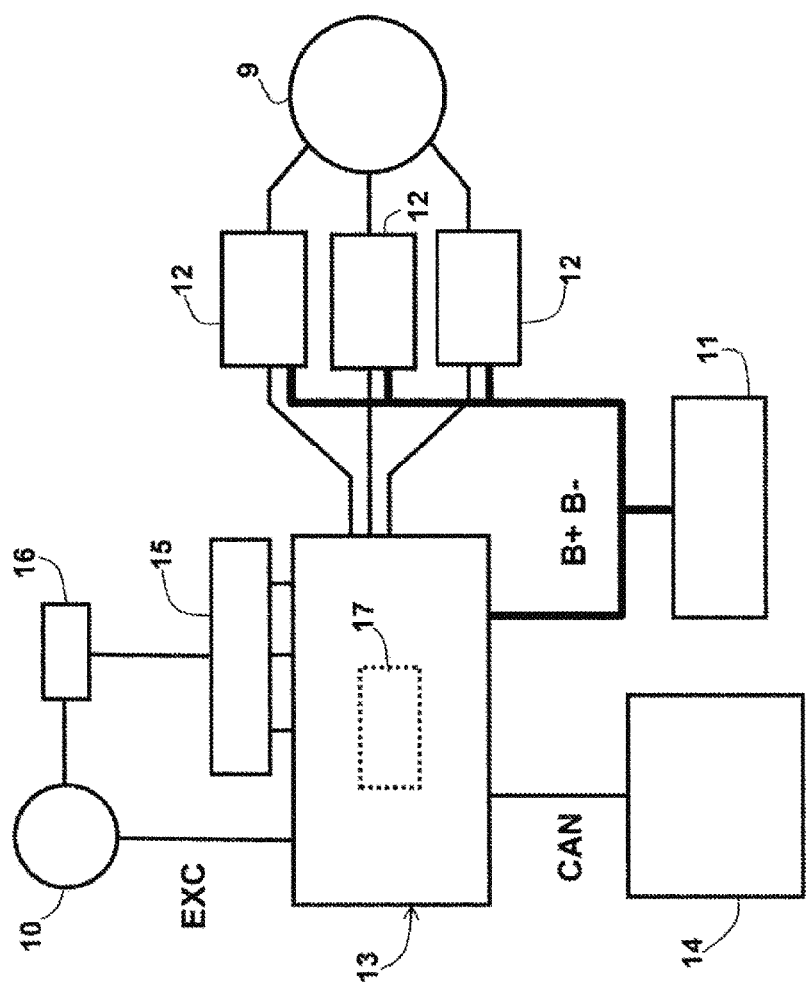
FIG. 2 is a synoptic electrical diagram of a device for starting or restarting a thermal engine of a motor vehicle of a type according to the invention.

The synoptic diagram of these electrical elements is shown in FIG. 2.

The alternator-starter 1 represented schematically comprises a three-phase stator 9 and a rotor 10 with excitation.

The three phase windings of the stator 9 are supplied B+, B− by a battery which is connected to the on-board power network 11 by power circuits 12 which are controlled by the control system 13.

The control system 13 also controls an excitation current EXC which circulates in an inductor of the rotor 10.

The electronic control system 13 receives functioning parameters of the thermal engine 2, and other context information via dedicated wired connections or via an on-board data communication bus of the LIN or CAN type, from the engine control unit 14.

For the purpose of limiting the detrimental vibratory effects, the method for starting or restarting the thermal engine 2 according to the invention consists substantially of pre-tensioning the belt 4 before the alternator-starter 1 applies sufficient engine torque to drive the thermal engine 2 rapidly.

In a first step, the control system 13 thus controls the alternator-starter 1 such that it supplies only predetermined reduced torque in order to tension the belt 4.

For this purpose, the starting or restarting device according to the invention comprises three Hall-effect sensors 15 integral with the stator 9, which make it possible to determine the angular position of the rotor 10 relative to the stator 9 by means of a magnetic target 16 which is secured on the rotor 10.

According to this angular position, the control system 13 controls the phase currents such that they have an angle of advance (phase difference with the counter electromotive force (counter EMF or back EMF) of the machine) corresponding to the required predetermined reduced torque.

A map of the predetermined reduced torque as a function of the angle of advance is stored in a memory 17 of the control system 13.

Figure 3A:
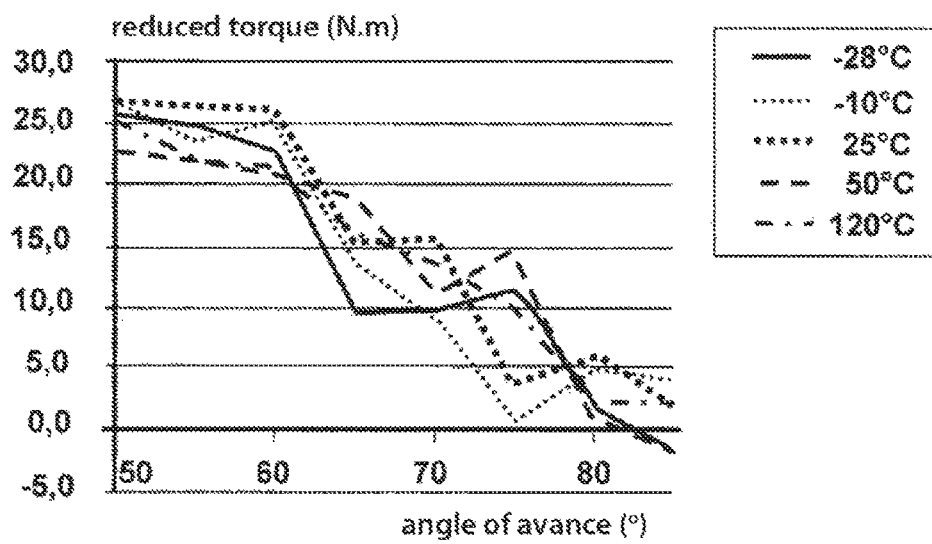
FIGS. 3a and 3b are the representation of a map, according to the angle of advance of the inverter and the temperature of the alternator-starter, of the predetermined reduced torque implemented in a preferred embodiment of the method and of the device for starting or restarting a thermal engine of a motor vehicle according to the invention, respectively in a starting phase and in a restarting phase (at 100 rpm).

FIG. 3a is a representation of an example of a map used during starting of a thermal engine 2 with a common cubic capacity.

In this example, an angle of opening of the inverter 12, 13 (i.e. the duty cycle of the phase currents in degrees) has been set to 135°, and an intensity of the excitation current EXC has been set to 8 A.

This intensity corresponds to a target value of the pre-flow step which precedes the first step of application of the predetermined reduced torque.

An angle of advance of approximately 60° makes it possible to obtain a reduced torque substantially equal to 20 N.m.

This reduced torque supplied by the alternator-starter 1 does not allow the thermal engine 2 to clear a first compression point, but permits tensioning of the belt 4.

The map takes into account a temperature of the alternator-starter 1.

However, as shown clearly in FIG. 3a, it has been found that this has only little impact for the machine concerned (curve in a solid line for −28° C., in a thin dotted line for −10° C., in a thick dotted line for 25° C., in a broken line for 50° C., and in a dot and dash line for 120° C.).

In a phase of restarting of the thermal engine 2, the map takes into account the speed of rotation of the alternator-starter 1.

Figure 3B:
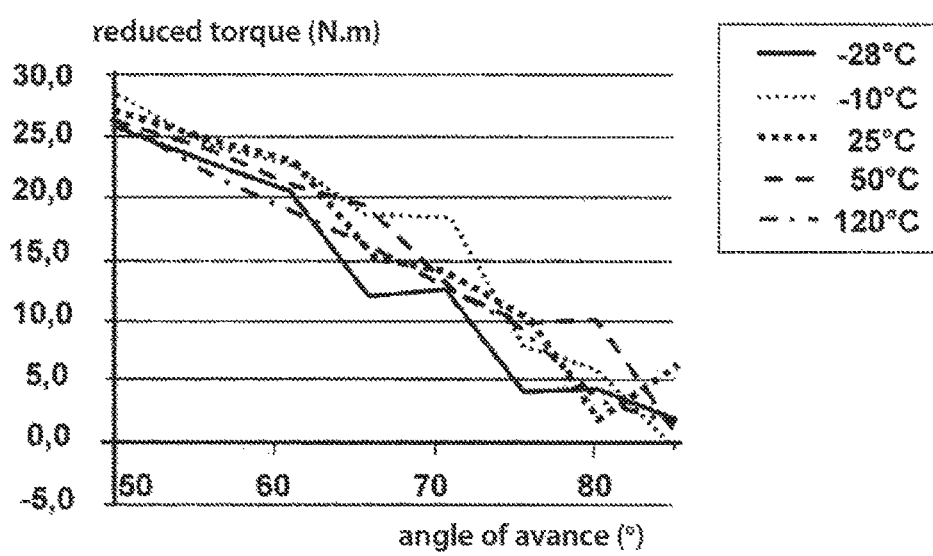

FIG. 3b is an example for a speed of rotation of 100 rpm in the same conditions as for FIG. 3a, i.e. an angle of opening of 135° and an excitation current EXC of 8 A.

In this case, an angle of advance of substantially 60° also makes it possible to obtain a reduced torque of approximately 20 N.m.

According to the invention, the map of the predetermined reduced torque according to the angle of advance generally takes into account the speed of rotation of the alternator-starter 1 preferably in a range from 0 to approximately 200 rpm, as well as other parameters, such as the intensity of the excitation current EXC, the angle of opening of the inverter, and the temperature.

The device for starting or restarting a thermal engine 2 according to the invention thus comprises as many corresponding sensors 15 as necessary, for example a shunt at the excitation circuit for measurement of the intensity of the excitation current EXC.

It will be appreciated that the invention is not limited solely to the preferred embodiment described above.

The map presented corresponds simply to the particular characteristics of an alternator-starter 1 and a thermal engine 2 selected by way of example.

The above description would apply to rotary electrical machines other than a three-phase alternator-starter with excitation 1.

The number of phases of these electrical machines can be more than three, and can for example be equal to six for hexaphase machines.

The method for starting or restarting a thermal engine 2 by means of a rotary electrical machine 1 according to the invention applies generally equally well to synchronous machines with permanent magnets, claw machines, machines with a wound rotor with double excitation, asynchronous machines, machines with variable reluctance, or direct current machines.

The invention thus on the contrary incorporates all the possible variant embodiments which would remain within the scope defined by the following claims.

The invention claimed is:

1. A method for starting or restarting a thermal engine (2) by a rotary electrical machine (1) comprising a drive unit (3) and a continuous transmission member (4) cooperating with said drive unit (3) and with said thermal engine (2) in order to start or restart said thermal engine (2), a tensioner (6) supported on a strand (7) of said continuous transmission member (4), said strand (7) extending between said rotary electrical machine (1) and said thermal engine (2), wherein said method comprising the steps of:
   in a first step, supplying a predetermined reduced torque by the rotary electrical machine (1) to the thermal engine (2) in a starting direction for a predetermined time in order to tension the continuous transmission member (4); and
   in a second step, supplying an optimal predetermined torque by the rotary electrical machine (1) to the thermal engine (2) to drive the thermal engine (2) rapidly so as to start the thermal engine (2);
   the predetermined reduced torque being lower than the optimal predetermined torque;
   said predetermined reduced torque controlled by controlling an angle of advance of an inverter (12, 13) supplying said rotary electrical machine (1);
   said continuous transmission member (4) being one of a belt (4) and a chain.

2. The method according to claim 1, wherein, in a starting phase, said predetermined reduced torque is lower than a nominal torque necessary for passage of a compression point of said thermal engine (2).

3. The method according to claim 1, wherein, in a restarting phase, said predetermined reduced torque depends on a speed of rotation of said rotary electrical machine (1).

4. The method according to claim 3, wherein said predetermined reduced torque is also controlled by controlling an angle of opening of said inverter (12, 13).

5. The method according to claim 1, wherein said predetermined reduced torque is also controlled by controlling an excitation current (EXC) of said rotary electrical machine (1).

6. The method according to claim 1, wherein said first step is preceded by a pre-flow step.

7. A device for starting or restarting a thermal engine (2), said device configured to implement the method according to claim 1, said device comprising:
   a rotary electrical machine (1) provided with a drive unit (3);
   a continuous transmission member (4) cooperating with said drive unit (3) of said rotary electrical machine (1) and with said thermal engine (2) in order to start or restart said thermal engine (2);
   a tensioner (6) supported on a strand (7) of said continuous transmission member (4), said strand (7) extending between said rotary electrical machine (1) and said thermal engine (2);
   an inverter (12, 13) supplying said rotary electrical machine (1);
   a control system (13) for said rotary electrical machine (1) controlling an engine torque,
   said device further comprising a device for acquisition of at least one parameter from amongst the group:
   a speed of rotation of said rotary electrical machine (1);
   an angle of advance of said inverter (12, 13);
   an angle of opening of said inverter (12, 13);

an excitation current (EXC) of said rotary electrical machine (1);

a temperature of said rotary electrical machine (1);

said control system (13) comprising a map (17) of a predetermined reduced torque as a function of said at least one parameter so as to tension said continuous transmission member (4) when said engine torque is equal to said predetermined reduced torque for a predetermined time, said predetermined reduced torque being lower than an optimal torque configured to drive said thermal engine (2) rapidly so as to start said thermal engine (2).

8. A control system (13) for a rotary electrical machine (1) configured to provide a device for starting or restarting a thermal engine (2) according to claim 7.

9. An alternator-starter (1) configured to be coupled to a thermal engine (2), said alternator-starter (1) comprising an integrated control system (13) according to claim 8.

10. The method according to claim 2, wherein said predetermined reduced torque is also controlled by controlling an excitation current (EXC) of said rotary electrical machine (1).

11. The method according to claim 3, wherein said predetermined reduced torque is also controlled by controlling an excitation current (EXC) of said rotary electrical machine (1).

12. The method according to claim 4, wherein said predetermined reduced torque is also controlled by controlling an excitation current (EXC) of said rotary electrical machine (1).

13. The method according to claim 2, wherein said first step is preceded by a pre-flow step.

14. The method according to claim 3, wherein said first step is preceded by a pre-flow step.

15. The method according to claim 4, wherein said first step is preceded by a pre-flow step.

16. The method according to claim 5, wherein said first step is preceded by a pre-flow step.

\* \* \* \* \*